United States Patent [19]

Drygalski et al.

[11] Patent Number: 4,556,225
[45] Date of Patent: Dec. 3, 1985

[54] REVERSE LIP POSITIVE VENTING SEAL

[75] Inventors: Gordon T. Drygalski, Chicago, Ill.; Dennis L. Otto, Malvern; Donald K. Ross, Eastlake, both of Ohio

[73] Assignee: Chicago Rawhide Mfg. Co., Elgin, Ill.

[21] Appl. No.: 484,490

[22] Filed: Apr. 13, 1983

[51] Int. Cl.⁴ .............................................. F16J 15/32
[52] U.S. Cl. .................................................. 277/152
[58] Field of Search .......... 277/152, 153, 134, DIG. 4

[56] References Cited

U.S. PATENT DOCUMENTS

| | | | |
|---|---|---|---|
| 3,801,111 | 4/1974 | Messenger | 277/153 |
| 4,106,781 | 8/1978 | Benjamin | 277/152 |
| 4,166,628 | 9/1979 | Blaydon | 277/152 |
| 4,174,845 | 11/1979 | Hadaway | 277/134 |
| 4,399,998 | 8/1983 | Otto | 277/134 |
| 4,425,838 | 1/1984 | Pippert | 277/152 |
| 4,426,094 | 1/1984 | Antonini | 277/134 |

Primary Examiner—Robert I. Smith
Attorney, Agent, or Firm—James T. FitzGibbon

[57] ABSTRACT

An oil or like fluid seal having a rigid exterior casing, a primary lip and an auxillary lip, with the primary or axially inner lip having a primary seal band surface which is generally cylindrical in its relaxed condition and which includes at least one hydrodynamic pumping element on its shaft contact surface, with the auxillary lip, in its relaxed condition, being of greater inside diameter than the primary lip, with the primary and secondary lips being spaced apart so as to define an intermediate annular groove of generally V-shaped cross-sections between them, with the pumping element acting to space portions of the primary lip apart from the associated shaft so as to provide initial venting of gas and vapors from the sealed cavity into the intermediate region and beneath the auxillary lip as cavity pressure increases so as avoid excessive pressure build up in the sealed region or sudden or erratic venting of such pressure.

12 Claims, 4 Drawing Figures

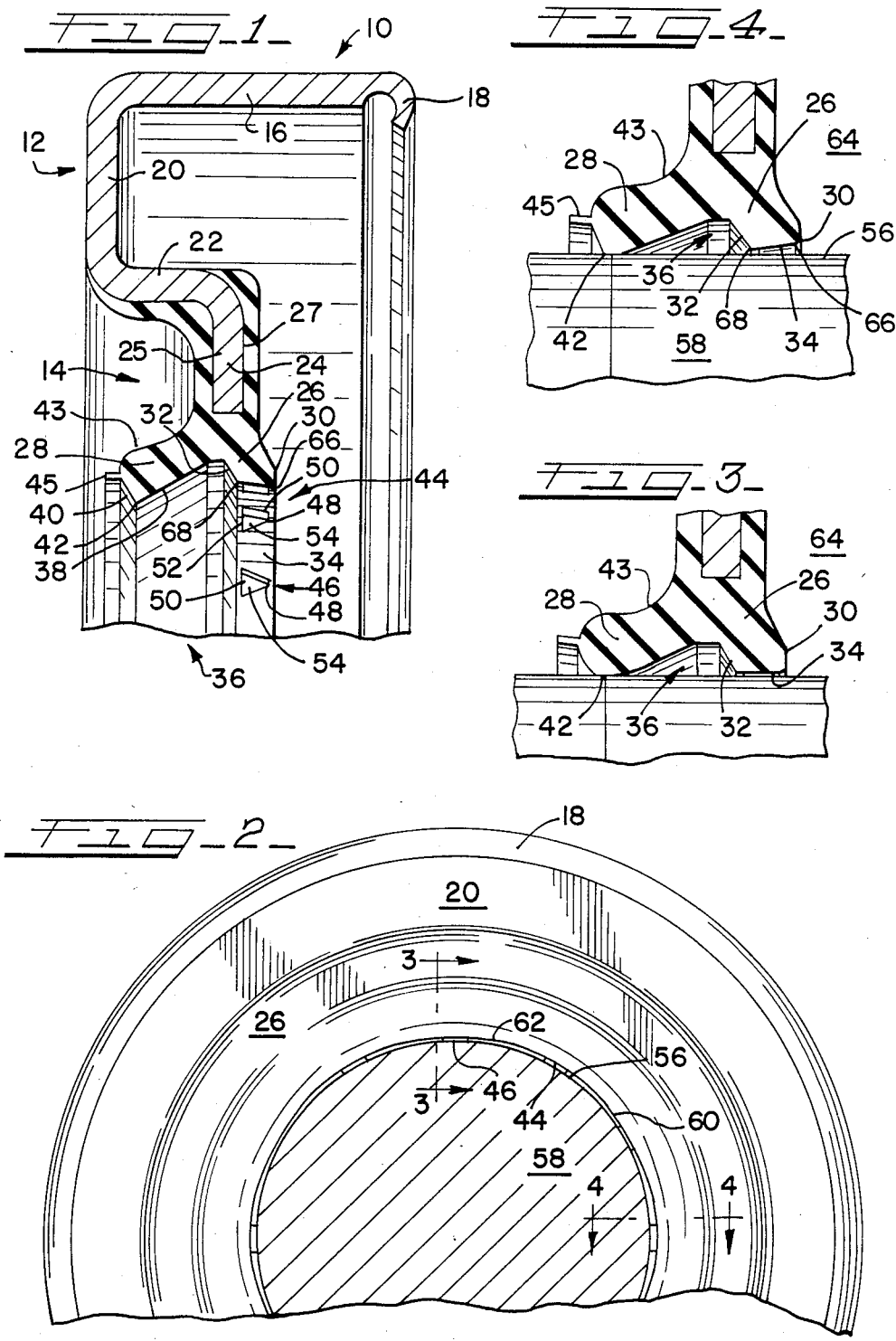

REVERSE LIP POSITIVE VENTING SEAL

The present invention relates generally to fluid seals, such as grease and oil seals, and more particularly to oil seals adapted to provide a so-called primary seal for grease within a sealed and lubricated region, to provide an excluder seal and to provide an opportunity for gas and vapor pressure which would otherwise build up within the sealed region to be vented to the outside, and to permit outside or atmospheric air to enter such region to prevent vacuum formation in the region.

In recent years, particularly in the automobile industry, there has been a need to provide extremely compact mechanical assemblies, particularly including drive line components. Most of this need has arisen because of the continual so-called "downsizing" of automobiles, which in turn has increased the popularity and incidence of front wheel drive vehicles. These automobiles, unlike previously conventional automobiles having a forward mounted engine and rear wheel drive, require not only the engine and many accessories, but also the transmission, differential and axle half shafts to be located at the front of the automobile. The provision for independently suspending the front wheels and for providing a steering mechanism also requires additional, mechanically complex components which must be incorporated within regions of gradually decreasing size.

With the advent of these compact assemblies, there has arisen a need for a seal which will reliably seal the interior of the mechanical assembly, and also permit gas and vapor to be vented from this region during temperature rise. These compact assemblies are now commonly largely filled with grease or like lubricants, and because of their small size, are considered "hard working" and thus characterized by rapid temperature rise and continued operation under conditions of relatively high temperature.

The gas and vapor pressure buildup in the sealed assembly, if not properly vented and controlled, can cause the entire seal literally to be "popped out" of its installed position, or in other cases, to wear rapidly or to leak prematurely. As in the past, while the price of the seal itself is not great in relation to that of the sealed parts, the labor involved in changing a seal once an installation has been completed is very large, and a failure of even a relatively inexpensive seal can lead to rapid wear-out, or even complete failure of sealed parts which are extremely expensive.

In seals of the type with which the invention is concerned, it has been conventional not only to have a so-called primary lip providing a primary seal, but also to have an auxiliary or dust lip provided to keep contaminants from approaching the area of the primary seal. By "primary" seal is meant a seal between relatively movable parts, usually the seal lip on the one hand and a shaft or the like on the other hand. By "secondary" seal is meant a seal between parts which do not move relative to each other, such as the exterior or other seal mounting surface and the counterbore within which it is received.

The present invention is concerned with seals having a primary lip and a dust or dirt lip, with the latter sometimes being referred to as an auxiliary lip. According to the invention, a primary lip of reduced size, cross-section and flexibility is provided, which includes an "oil side" surface facing towards the sealed region, and an "air" side surface facing away from the sealed region with these surfaces meeting along a primary seal band which is spaced just apart from the associated shaft and is positioned there by pumping elements which have shaft-engaging surfaces as well as "working" surfaces adapted to return leaking grease to the sealed region. The auxiliary lip is much larger than usual and is spaced axially apart from the primary lip, leaving an annular groove of generally V-shaped cross-section between the two lips. In the past, this area has also been subject to a high temperature, inasmuch as the auxiliary lip has run without the benefit of much, if any, lubricant, and because the region between the two was sealed against venting because both lips lay in contact with, or were very closely spaced from, the associated shaft.

According to the present invention, the annular groove between these seals may accommodate a measurable amount of grease, enabling the auxiliary lip to run in a lubricated condition, while the primary lip remains very slightly spaced from the surface of the associated shaft to permit venting from the sealed region. At the same time, the series of hydrodynamic or pumping formations provided on the primary lip serve to return most or all of the grease which may escape therefrom into the groove during operation.

In view of the failure of the prior art to provide a seal for use in a compact sealing region of the type referred to, it is an object of the present invention to provide an improved fluid seal characterized by moderate operating temperatures in use, and having both primary and auxiliary lips as well as a series of hydrodynamic pumping elements associated with the primary lip.

Another object of the present invention is to provide a single piece oil seal having a small primary lip and a larger secondary lip, and providing a novel primary lip configuration.

A further object of the invention is to provide an automotive or like type bearing seal which includes a plurality of hydrodynamic elements on the primary lip, with such surface being adapted to keep parts of the primary lip spaced apart from the surface of an associated shaft, and to retain grease within the sealed region and in the region between the two lips.

A still further object of the invention is to provide a seal having the advantages of reduced running temperature and providing for venting gases and vapors from the sealed region, but which is also able to be manufactured reliably at low cost by known techniques.

Yet another object of the invention is to provide a seal having a primary lip adapted to fit loosely in relation to an associated shaft and to be supported in this position by a plurality of circumferentially spaced apart hydrodynamic pumping elements, and to have a secondary or auxiliary or lip dimension adapted to provide a closer or more snug fit over such shaft.

An even further object of the invention is to provide a seal which includes an annular groove of generally V-shaped cross-section adapted to lie between primary and secondary sealing lips, and to be filled with grease for lubrication and to reduce the temperature in this region, and which seal further includes hydrodynamic means for controlling entry of excess grease into this region.

A still further object of the invention is to provide a seal having, in its relaxed state, a primary lip portion of larger diameter and thinner cross-section than the auxiliary lip, and having hydrodynamic pumping elements formed on circumferentially spaced apart portions of the primary lip seal band area, with the primary seal band area comprising a cylindrical or slightly frusto-conical surface of substantial width in relation to prior art seals.

Another object of the invention is to provide a seal wherein the intended primary seal band area is cylindrical or of a slightly frusto-conical configuration with its reduced diameter portion lying toward the oil side edge of the seal band when the seal is in a relaxed condition, and adapted upon installation to provide a primary seal band surface which is cylindrical or slightly frusto-conical with its reduced diameter at the air side edge of the primary seal band, with the primary lip further including a frusto-conical surface directed toward the shaft and away from the sealed region, and with the pumping elements lying on the primary seal band and with the air and oil side surfaces of the primary seal band being free from pumping elements.

The foregoing objects and other advantages of the invention are achieved in practice by providing a seal having an exterior seal casing which includes a mounting surface and which includes a seal lip body bonded to a portion of the casing, with the seal lip body comprising annular surfaces defining the air and oil side portions of a primary lip which meet along a generally cylindrical locus of measurable axial extent to provide a primary seal band, a plurality of spaced apart hydrodynamic pumping elements located on this seal band, and an auxiliary lip defined by a pair of frusto-conical surfaces meeting along a generally circular locus to provide an auxiliary or excluder lip portion, with said primary and secondary lips being spaced apart by an annular region of generally V-shaped cross-section, and with the pumping elements serving to maintain the primary lip seal band spaced just apart from an associated shaft, at least in the regions of the elements, and with said auxiliary lip being of reduced diameter in relation to said seal band dimension in the relaxed condition of the seal.

BRIEF DESCRIPTION OF THE DRAWINGS

FIG. 1 is a vertical sectional view of a portion of a seal made according to the invention;

FIG. 2, is an end view, partly in elevation and partly in section, and with portions broken away, showing portions of the seal of the invention as viewed from the "oil side" thereof;

FIG. 3 is a fragmentary vertical sectional view of the seal of FIGS. 1 and 2, taken along lines 3—3 of FIG. 2;

FIG. 4 is a fragmentary vertical sectional view of the seal of FIGS. 1 and 2, taken along lines 4—4 of FIG. 2.

While it will be understood that the seal of the invention may be embodied in different forms, and may be utilized in different applications, a description thereof will be made wherein the seal is adapted to be received on its outer diameter within a machine counterbore, wherein the lips of the seal act radially inwardly upon an associated shaft, and wherein the sealed medium is grease.

Referring now to the drawings in greater detail, FIG. 1 shows a seal assembly embodying the invention and generally designated 10, to include a casing portion generally designated 12 and an elastomeric seal body portion generally designated 14. The casing portion 12 includes an axially extending mounting flange 16 having the axially inner end thereof formed in a curl 18. By "axially inner" as used herein is meant the portion of the seal directed toward the interior of the sealed region, sometimes called the "oil side" of the seal. The casing portion 12 also includes a generally radially extending flange 20, joined to an intermediate or axially extending offsetting flange 22, which is in turn joined to a radially innermost, radially extending heel or bonding flange portion 24.

Both annular end face surfaces 25, 27 of the bonding flange 24 are surrounded by portions of the elastomeric seal body 14, the principal elements of which are a small primary seal lip body 26 and an auxiliary or excluder lip body 28. Unlike prior art seals, the primary body 26, as is shown in the drawings, is of reduced thickness and its inner diameter is enlarged in relation to the inner diameter excluder lip body.

Referring again to the primary lip body 26, it will be noted that it includes a generally annular oil side surface portion 30, a frusto-conical air side surface portion 32 and a primary seal band surface 34 extending generally axially between the radially innermost edges of the surfaces 30, 32 and, depending upon whether it is in a relaxed or installed condition, being either cylindrical or slightly frusto-conical. As is also shown, there is an annular groove generally designated 36, of V-shaped cross-section lying between the primary and secondary seal bodies 26, 28, which groove 36 is important in the functioning of the seal, as will appear.

Referring now to the auxiliary or excluder lip body 28, it will be noted that this unit is defined in part by an axially inner frusto-conical surface 38, and an axially outer frusto-conical surface 40, with these surfaces meeting along a generally circular locus to provide an auxiliary or excluder seal band 42. The body 28 has a contoured exterior surface 43 extending up to and along the wall 25 of the stamping 12, and may include a so-called "tear trim" residual lip portion 45 formed in molding.

Referring again to the primary seal band 34, an important feature of the invention is that the seal band has a plurality of pumping elements 44, 46, disposed thereon in circumferentially spaced apart relation, each of which elements 44, 46 includes a point 48 spaced apart from the rear walls 52 of the elements 44, 46, with the point being formed by the junction of the element sidewalls 50.

The other surface of the pumping elements 44, 46 is a contact surface 54, which is adapted to lie upon and engage the outer surface 56 of an associated rotary shaft 58. As shown in the drawings, when the pumping elements 44, 46, which are shown as being of differing radial dimension or height, are engaged and lie upon the surface 56, a plurality of venting spaces or passages 60, 62 are provided. In the case of a pumping element 44 having a relatively great radial dimension, the adjacent venting space 60 is larger than the space 62 lying adjacent the smaller element 46.

It is not necessary, according to the invention, that the pumping elements 44, 46 be different from each other in radial height, but this is an optional feature of the invention.

Referring now to the operation of the seal, assuming that it is installed in place within a seal counterbore (not shown) in a manner known to those skilled in the art, the seal band 42 of the secondary lip engages the outer surface 56 of the shaft 58 is a relatively snug relation; this surface is lubricated by grease which lies within the annular groove 36. The sealed region, shown as 64 in FIGS. 3 and 4, is likewise filled with grease, which grease also lies beneath the primary seal band 34. As shown in FIG. 2, there is a series of slight working clearances or vent passages 60, 62 lying adjacent the associated pumping elements 44, 46; these passages, which are filled with grease so as to provide lubricity of the seal in use also serve to vent vapor and gas from the sealed region 64 when there is rapid temperature rise. This prevents undesired buildup of pressure within the sealed region 64.

With minimal loss of grease, the vapors or gases may pass beneath the seal band 34, and enter the groove 36. From here the gas may readily pass beneath the excluder lip seal band 42 inasmuch as the balance of fluid forces existing in the groove area 36 operates to unseal or open the seal provided by the excluder lip 28. Incidental passage of slight amounts of grease into this area during discharge of gas do not measurably affect seal performance, but in fact enhance it by reason of keeping the excluder lip area well lubricated.

In many prior art designs, unlike the present design, the as-molded inside diameter of the excluder lip was slightly larger than that of the primary lip, it being adapted to operate, especially after initial wearing-in, at a slight working clearance. Expressed otherwise, in the seal art, the "residual interference" or "molded interference" between the shaft and the excluder seal has generally been less than the "residual interference" between the seal band on the primary lip seal and that of the sealed shaft. By "residual interference" is meant the difference between the inside diameters of a seal and its associated shaft, it being common to size seals such that their inside diameters are slightly smaller than those of the associated shaft to insure that the elastomeric seal body will be stretched radially outwardly by insertion of the shaft therethrough, and that the elastomeric seal lips will consequently be urged radially inwardly and apply a sufficient radial load to the sealed mechanism to insure against leakage.

In the case of the present invention, there is more residual interference on the auxiliary or excluder lip, which is designed to run wet rather than dry, as in the prior art, whereas the primary lip body is made with less residual interference.

According to the present invention, the provision of the pumping elements 44, 46 on the seal band area 34, in combination with the relatively great axial extent of the primary seal band 34, cooperates to insure that when grease is periodically expelled beneath the seal band 34 in the process of venting gases and vapors, the hydrodynamic elements or formations "pump" the major portion of this grease back into the sealed region 64. This maintains an adequate supply of grease beneath the lip at all material times, which is necessary in the "hard working" environment to which seals of the type with which the invention is concerned are normally exposed. Consequently, in operation, the seal of the invention permits venting of gases and vapors without loss of measurable amounts of grease, permits the intermediate groove 36 lying between the primary and excluder lip bodies 26, 28 to run cool, and to retain a quantity of lubricate sufficient to lubricate the seal band 42 of the excluder lip.

The hydrodynamic elements or formations indicated are shown as being triangular, but it will be understood that there are other suitably shaped formations such as crescents, triangles of other aspect ratios, unidirectional or bidirectional wedges such as trapezoids, rhombuses, or the like which may be used for this purpose.

Referring now to the shape of the seal band 34 in its as-molded condition, in some cases, the edge 66 of the seal band lying towards the oil side may be of a slightly reduced inside diameter in relation to the edge 68 lying toward the air side of the seal. This condition is depicted in FIG. 1. When the seal is installed, as shown in FIG. 3, the seal band 34 may assume a virtually cylindrical configuration, or might even be tilted slightly in the opposite direction, as shown in FIG. 4. In any case, the seal band is more generally cylindrical than would be the case in prior art seals wherein the hydrodynamic formations would be formed on an air side frusto-conical surface, such as the surface 32 which partially defines the V-shaped groove 36.

The primary seal lip, which is relatively thin and flexible has a relatively wide seal band for its size, and still includes a frusto-conical air side surface, but it is not a sleeve or bush-type seal.

In use, the seal provides good venting action, low temperature running and reliable installation, and is adapted for a number of specialty applications, particularly those involving compact arrangements of bearings lubricated by grease which nearly fills the sealed regions.

It will thus be seen that the present invention provides a novel fluid seal having a number of advantages and characteristics including those pointed out above and others which are inherent in the invention. Several preferred embodiments of the invention having been described by way of illustration, it is anticipated that changes and modifications of the described fluid seals will occur to those skilled in the art and that such changes and modifications may be made without departing from the spirit of the invention or the scope of the appended claims.

I claim:

1. A fluid seal for retaining lubricant within a sealed region during relative movement of a first machine member and a shaft associated in use with said machine member, said seal comprising, in combination, a relatively rigid casing portion adapted to be received in fluid tight relation with respect to said first machine member, and a sealing lip body having portions adapted to contact said associated shaft, said casing including a mounting surface portion adapted for snug engagement with respect to said first machine member, and a bonding portion adapted to have a portion of an associated sealing lip body bonded thereto, said sealing lip body being bonded to said bonding portion of said casing and comprising a primary lip portion and an auxiliary lip portion said primary lip portion being defined at least in part by an axially innermost, radially inwardly and axially inwardly extending, annular oil side surface, an axially spaced apart, generally frusto-conical air side surface, and an annular, primary seal band surface which is generally cylindrical in its relaxed condition and which extends between the innermost edges of said oil side and air side surfaces, said seal band surface having thereon at least one hydrodynamic pumping element, said element having a radially inwardly directed, shaft-engaging surface portion and at least one working surface, said auxiliary lip portion being defined in part by a first frusto-conical surface partially directed in use toward said shaft and away from said sealed region, and a second frusto-conical surface directed partially towards said shaft and partially toward said sealed region, said frusto-conical surfaces meeting each other along a generally circular locus to form an auxiliary lip seal band, said second surface defining said portion of said auxiliary lip and said air side surface of said primary lip being axially spaced from each other and at least partially defining therebetween an annular groove of generally V-shaped cross-section, said seal being adapted for reception over an associated shaft to provide a generally fluid tight seal, with said pumping element being adapted, in its relaxed condition, to space parts of said primary seal band slightly apart from said associated shaft in use to provide vent means permitting the free passage of gas and vapor from said sealed region, without substantial prior pressure buildup in said region.

2. A fluid seal as defined in claim 1 wherein said primary lip is of reduced cross-sectional area in relation to the cross-sectional area of said auxiliary lip.

3. A fluid seal as defined in claim 1 wherein said at least one pumping element comprises a plurality of elements.

4. A fluid seal as defined in claim 3 wherein, as among themselves, said pumping elements are of differing radial heights.

5. A fluid seal as defined in claim 3 wherein, in the relaxed condition of said seal unit, the inside diameter of said primary seal band is greater than the inside diameter of the seal band formed on said auxiliary lip.

6. A fluid seal as defined in claim 1 wherein the innermost edge of said oil side surface of said primary lip is of reduced diameter with respect to the innermost edge of the air side surface of said primary seal lip.

7. A fluid seal as defined in claim 1 wherein the innermost edge of said oil side surface of said primary lip os of smaller diameter with respect to the innermost edge of the air side surface of said primary seal lip.

8. A fluid seal as defined in claim 1 wherein the innermost edge of said oil side surface of said primary lip and said innermost edge of said air side surface of said primary lip are of the same diameter.

9. A fluid seal as defined in claim 2 wherein said pumping elements are in the form of triangles, said triangles having the apexes thereof directed toward the axially inner portion of said seal.

10. A fluid seal as defined in claim 2 wherein said pumping elements are spaced circumferentially apart from each other by a substantially equal distance.

11. A fluid seal as defined in claim 2 wherein said mounting surface portion of said casing comprises an axially extending mounting flange, and wherein said casing further includes a radially inwardly directed flange and an axially inwardly extending offsetting flange extending between and joining said bonding portion to said mounting portion.

12. A fluid seal as defined in claim 1 wherein said mounting surface portion comprises a radially outwardly directed surface of an axially extending flange forming a part of said casing.

* * * * *